United States Patent
Aleem et al.

(10) Patent No.: US 10,976,814 B2
(45) Date of Patent: *Apr. 13, 2021

(54) METHOD AND SYSTEM FOR EYE TRACKING WITH GLINT SPACE RECALIBRATION ON WEARABLE HEADS-UP DISPLAY

(71) Applicant: GOOGLE LLC, Mountain View, CA (US)

(72) Inventors: Idris S. Aleem, Kitchener (CA); Andrew S. Logan, Waterloo (CA); Mayank Bhargava, Waterloo (CA)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/376,319

(22) Filed: Apr. 5, 2019

(65) Prior Publication Data

US 2019/0317597 A1 Oct. 17, 2019

Related U.S. Application Data

(60) Provisional application No. 62/658,431, filed on Apr. 16, 2018.

(51) Int. Cl.
| | | |
|---|---|---|
| *G06F 3/01* | (2006.01) | |
| *G06T 7/73* | (2017.01) | |
| *G06K 9/00* | (2006.01) | |
| *G06T 7/246* | (2017.01) | |

(Continued)

(52) U.S. Cl.
CPC .......... *G06F 3/013* (2013.01); *G02B 27/0093* (2013.01); *G02B 27/0172* (2013.01); *G06K 9/00604* (2013.01); *G06T 7/246* (2017.01); *G06T 7/73* (2017.01); *G02B 2027/014* (2013.01); *G02B 2027/0174* (2013.01);
(Continued)

(58) Field of Classification Search
CPC ... G06F 3/013; G02B 27/0093; G02B 27/017; G02B 27/0172; G02B 27/0176; G02B 2027/0174; G02B 2027/0178; G02B 2027/0187; H04N 13/332–344; G06K 9/00597–0061; G06T 7/246; G06T 7/73; G06T 2207/10048

See application file for complete search history.

(56) References Cited

U.S. PATENT DOCUMENTS

| | | | |
|---|---|---|---|
| 2013/0050070 A1* | 2/2013 | Lewis | |
| 2017/0099481 A1* | 4/2017 | Held | G02B 27/017 |
| 2017/0332901 A1* | 11/2017 | Hwang | |

\* cited by examiner

*Primary Examiner* — Gene W Lee

(57) ABSTRACT

A method of tracking an eye of a user includes generating an infrared light, scanning the infrared light over the eye, and detecting reflections of the infrared light from the eye over an eye tracking period. A plurality of glints is identified from the reflections of the infrared light detected. A glint center position of each glint in a glint space is determined and transformed to a gaze position in a display space. At least once during the eye tracking period, an image of the eye is reconstructed from a portion of the reflections of the infrared light detected. A pupil is detected from the image, and a pupil center position is determined. A glint-pupil vector is determined from the pupil center position and the glint center position of at least one glint corresponding in space to the pupil. The glint space is recalibrated based on the glint-pupil vector.

20 Claims, 12 Drawing Sheets

(51) Int. Cl.
*G02B 27/01* (2006.01)
*G02B 27/00* (2006.01)
(52) U.S. Cl.
CPC ............... *G02B 2027/0187* (2013.01); *G06T 2207/10048* (2013.01)

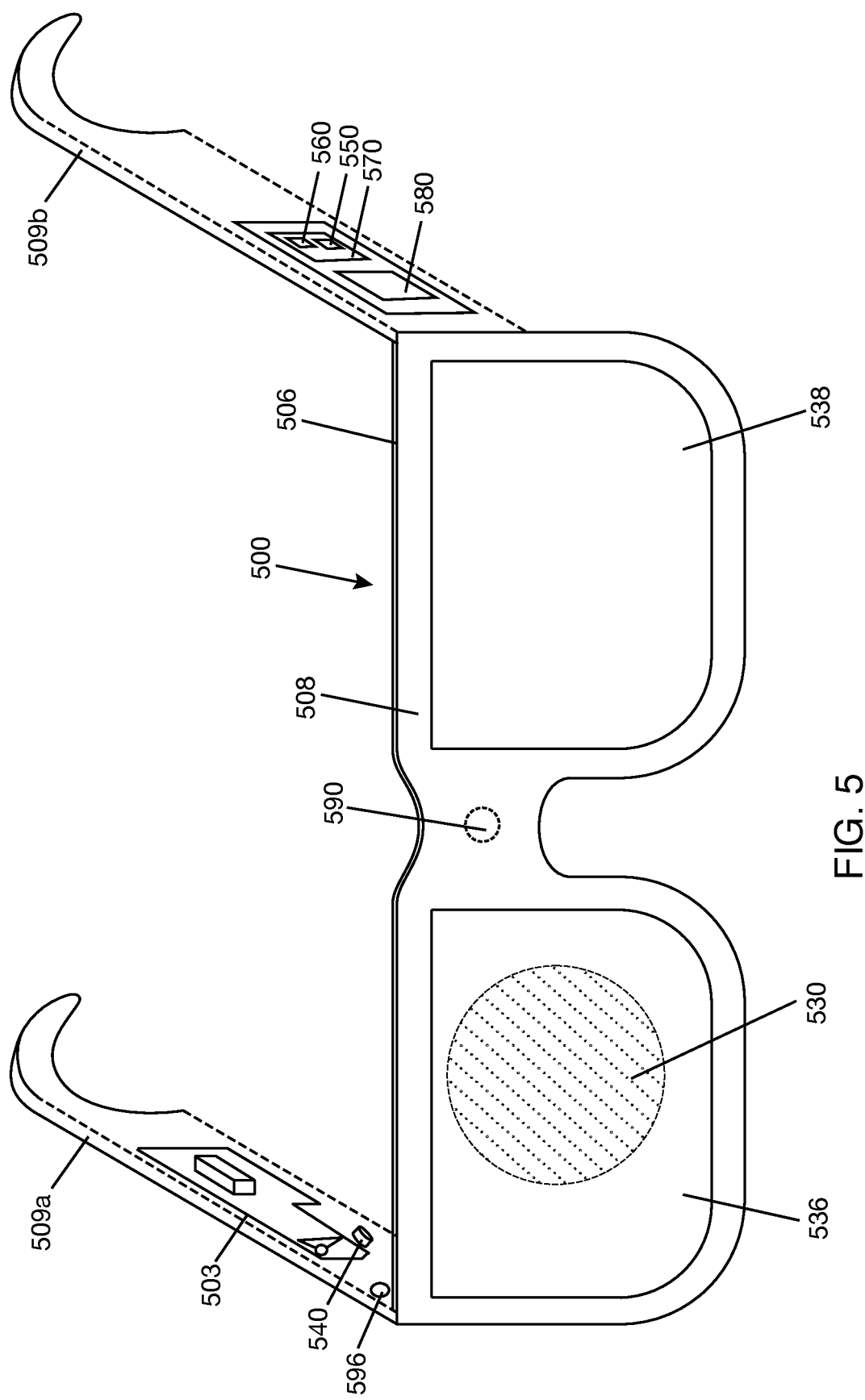

METHOD AND SYSTEM FOR EYE TRACKING WITH GLINT SPACE RECALIBRATION ON WEARABLE HEADS-UP DISPLAY

CROSS-REFERENCE TO RELATED APPLICATIONS

This application claims the benefit of U.S. Provisional Application No. 62/658,431, filed 16 Apr. 2018, titled "Method and System for Eye Tracking in Wearable Heads-Up Display", the content of which is incorporated herein in its entirety by reference.

TECHNICAL FIELD

The disclosure relates to eye tracking on head-mounted electronic devices, such as head-mounted displays.

BACKGROUND

A head-mounted display is a wearable electronic device that can be worn on the head of a user and that positions a display in the field of view of at least one eye of the user when worn. A wearable heads-up display (WHUD) is a head-mounted display that enables the user to see displayed content but does not prevent the user from being able to see the external environment of the user. In general, the display component of a WHUD is at least partially transparent and/or sized and positioned to occupy only a portion of the field of view of the user, allowing the user to see the external environment through and/or around the displayed content.

Eye tracking is a process by which one or more of position, orientation, and motion of an eye may be measured or monitored. In many applications, this is done with a view towards determining the gaze direction of a user. There are various techniques for measuring the position, orientation, and/or motion of the eye, the least invasive of which employs one or more optical sensors, e.g., cameras, to optically track the eye. Common techniques involve illuminating or flooding the eye with infrared light and measuring reflections from the eye with at least one optical sensor that is tuned to be sensitive to the infrared light. Information about how the infrared light is reflected from the eye is analyzed to determine the position, orientation, and/or motion of one or more eye features such as the cornea, pupil, iris, and/or retinal blood vessels.

Eye tracking functionality is attractive in WHUDs for various reasons. Some examples of the utility of eye tracking in WHUDs include influencing where content is displayed in the field of view of the user, conserving power by not displaying content that is outside of the field of view of the user, influencing what content is displayed to the user, determining where the user is looking or gazing, determining whether the user is looking at displayed content on the display or at scenes in the external environment, and providing an interface through which the user may control or interact with displayed content.

A challenge in incorporating eye tracking functionality into a WHUD is how to account for movements of the WHUD and/or head of the user during eye tracking since these motions can lead to errors or inconsistencies in the gaze positions obtained from eye tracking. A small error in gaze position due to WHUD and/or head movement, e.g., an error of 1° on a WHUD having a span of only 10°, can result in an unusable gaze-dependent user interface. For example, if the user intends to focus on a choice on the user interface, the gaze position with the error may indicate that the user is focusing elsewhere on the user interface, or even nowhere on the user interface. There is a need in the art for a WHUD that implements a method and a system of eye tracking that take into account movements of the WHUD and/or head of the user wearing the WHUD during eye tracking.

SUMMARY

A method of tracking an eye of a user may be summarized as including: (a) generating an infrared light over an eye tracking period, (b) scanning the infrared light over the eye, (c) detecting reflections of the infrared light from the eye, (d) identifying a plurality of glints from the detected reflections of the infrared light, (e) determining a glint center position of each glint relative to a glint space, (f) transforming each glint center position from the glint space to a gaze position in a display space, (g) reconstructing at least one image of the eye from a portion of the detected reflections of the infrared light, (h) detecting a pupil in the at least one image, (i) determining a pupil center position of the pupil, (j) determining a glint-pupil vector from the pupil center position and the glint center position of at least one glint corresponding in space to the pupil, and (k) recalibrating the glint space based on the glint-pupil vector.

The method may include selectively adjusting a display content in the display space based on the gaze position.

The method may include scanning visible light over the eye during at least a portion of scanning the infrared light over the eye.

Act (b) of the method may include scanning the infrared light over the eye by at least one scan mirror.

Act (d) of the method may include (d.1) detecting the reflections of the infrared light having an intensity that exceeds an intensity threshold. Act (d.1) may include detecting a centroid of rising and falling edges of an intensity profile of at least one reflection having an intensity exceeding the intensity threshold. Act (e) may include identifying a scan orientation of the at least one scan mirror corresponding in space to the glint and mapping the scan orientation to a position in the glint space.

Act (b) may include scanning the infrared light over a transparent combiner positioned in the field of view of the eye and redirecting the infrared light towards the eye by the transparent combiner. The transparent combiner may include at least one of an infrared hologram that is responsive to the infrared light and unresponsive to visible light and a hot mirror that is responsive to the infrared light and unresponsive to visible light.

The method may include (l) determining a first mapping function that transforms glint position coordinates from the glint space to gaze position coordinates in the display space and a second mapping function that transforms glint-pupil vectors from a glint-pupil vector space to gaze position coordinates in the display space. Act (f) may include transforming the glint center position from the glint space to the gaze position in the display space using the first mapping function. Act (k) may include (k.1) mapping the glint-pupil vector to a calibrating gaze position in the display space using the second mapping function and (k.2) recalibrating the glint space based on the calibrating gaze position. Act (k.2) may include applying an offset to the first mapping function such that a gaze position obtained from the glint center position by the first mapping function and applied offset is consistent with a gaze position obtained from the glint-pupil vector by the second mapping function.

Act (g) may occur at a scheduled time during the eye tracking period.

Acts (a), (b), and (c) may be performed on a WHUD, and act (g) may occur in response to movement of the WHUD or in response to interaction of the user with the WHUD.

Act (c) may include detecting the reflections of the infrared light by at least one photodetector.

A head-mounted apparatus, e.g., a WHUD, may be summarized as including: a support frame that in use is worn on a head of a user; an optical combiner lens carried by the support frame, the optical combiner lens including a transparent combiner that is positioned within a field of view of the eye when the support frame is worn on the head of the user; a scanning laser projector carried by the support frame, the scanning laser projector including an infrared laser diode to generate infrared light and at least one scan mirror to reflect the infrared light; an infrared detector carried by the support frame; a processor carried by the support frame, the processor communicatively coupled to the scanning laser projector and the infrared detector; and a non-transitory processor-readable storage medium communicatively coupled to the processor. The non-transitory processor readable storage medium stores data and/or processor-executable instructions that, when executed by the processor, cause the apparatus to: generate an infrared light by the infrared laser diode over an eye tracking period; scan the infrared light over at least a portion of the optical combiner lens and redirect the infrared light from the optical combiner lens to the eye of the user by the transparent combiner; detect reflections of the infrared light from the eye by the infrared detector; identify a plurality of glints from the detected reflections of the infrared light; determine, by the processor, a glint center position of each glint in a glint space; transform, by the processor, each glint center position from the glint space to a gaze position in a display space in a field of view of the eye; reconstruct, by the processor, at least one image of the eye from a portion of the detected reflections of the infrared light; detect, by the processor, a pupil in the at least one image of the eye; determine, by the processor, a pupil center position of the pupil; determine, by the processor, a glint-pupil vector from the pupil center and a glint center position of at least one glint corresponding in space to the pupil; and recalibrate, by the processor, the glint space based on the glint-pupil vector.

The scanning laser projector may further include at least one visible laser diode to generate visible light.

The transparent combiner may include a wavelength-multiplexed holographic optical element including an infrared hologram that is responsive to the infrared light and unresponsive to the visible light and at least one visible hologram that is responsive to the visible light and unresponsive to the infrared light.

The transparent combiner may include a hot mirror that is responsive to the infrared light and unresponsive to the visible light or an infrared hologram that is responsive to the infrared light and unresponsive to the visible light.

The transparent combiner may include a lightguide having an input area to receive the visible light generated by the at least one visible laser diode and an output area to output the visible light.

The non-transitory processor-readable storage medium may further store data and/or processor-executable instructions that, when executed by the processor, cause the apparatus to adjust a display content in a field of view of the eye by the scanning laser projector based on the gaze position of the eye.

The support frame of the apparatus may have a general shape and appearance of eyeglasses.

The foregoing general description and the following detailed description are exemplary of various embodiments of the invention(s) and are intended to provide an overview or framework for understanding the nature of the invention(s) as it is claimed. The accompanying drawings are included to provide further understanding of various embodiments of the invention(s) and are incorporated in and constitute part of this specification. The drawings illustrate various embodiments of the invention(s) and together with the description serve to explain the principles and operation of the invention(s).

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Unless indicated otherwise, the particular shapes of the elements as drawn are not necessarily intended to convey any information regarding the actual shape of the particular elements and have been solely selected for ease of recognition in the drawing.

FIG. 4C-2 is a cross-sectional view of a lightguide and a hot mirror integrated with an eye side lens and world side lens, with the hot mirror on an outer surface of the eye side lens.

FIG. 5 is a perspective view of a WHUD that may be used for eye tracking and content display.

DETAILED DESCRIPTION

Figure 1A:
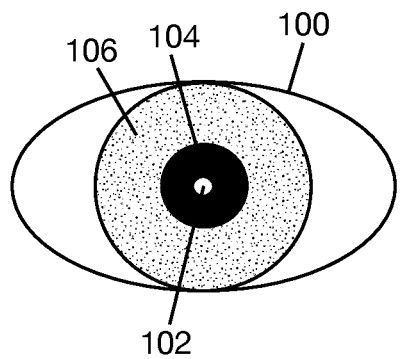
FIGS. 1A-1C are schematic diagrams showing an illuminated eye at different gaze positions.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, the word "comprise" and variations thereof, such as, "comprises" and "comprising" are to be construed in an open, inclusive sense, that is as "including, but not limited to."

In this disclosure, reference to "one embodiment" or "an embodiment" means that a particular feature, structures, or characteristics may be combined in any suitable manner in one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments In this disclosure, the term "infrared" will be understood to include "near infrared" and will generally refer to a wavelength of light that is larger than the largest wavelength of light that is typically visible to the average human eye. Light that is visible to the average human eye, i.e., "visible light" herein, is generally in the range of 400 nm-700 nm. Thus, as used herein, the term "infrared" refers to a wavelength that is greater than 700 nm, up to 1 mm.

In this disclosure, the term "WHUD" refers to an electronic device that can be worn on the head of the user, that secures at least one display within a field of the view of the user when worn on the head of the user, and that enables the user to see displayed content without preventing the user from seeing the external environment of the user. The component of the WHUD on which content is displayed is either transparent or semitransparent or at a periphery of the field of view of the user to enable viewing of the displayed content without preventing viewing of the external environment.

In this disclosure, the term "home position," as used with a WHUD, refers to the optimal snug position, or a normal resting position, of a support frame of the WHUD on the head of a given user. The home position is the position of the WHUD on the head of a given user at which content may be displayed within the field of view of the user.

In this disclosure, the term "glint center position" refers to a representative position of a glint relative to an image of an eye. The glint center may be an approximate geometric center of the glint.

In this disclosure, the term "pupil center position" refers to a representative position of a pupil relative to an image of an eye. The pupil center may be an approximate geometric center of the pupil.

When an eye is illuminated with infrared light (or visible light), specular reflections are generated at different ocular interfaces in the eye. These reflections are commonly referred to as Purkinje images, named after the Czech anatomist and physiologist Johann Purkinje. The first and brightest of the Purkinje images (P1 image) is from the outer surface of the cornea and is known as "glint."

Figure 1B:
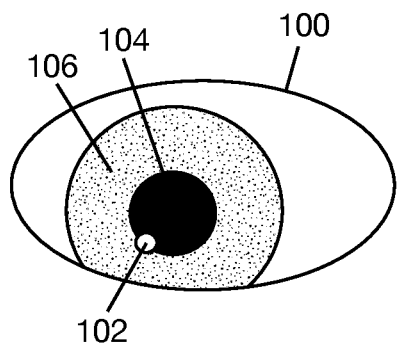
Figure 1C:
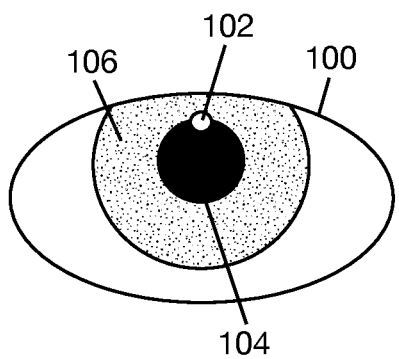
Figure 1D:
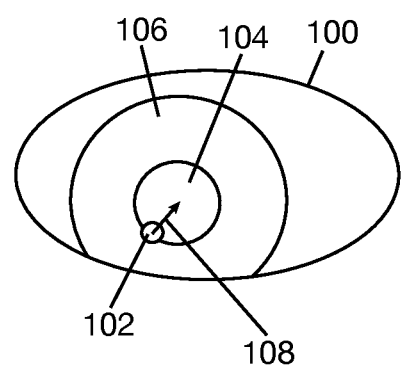
FIGS. 1D-1E are schematic diagrams showing glint-pupil vector on an illuminated eye at different gaze positions.
Figure 1E:
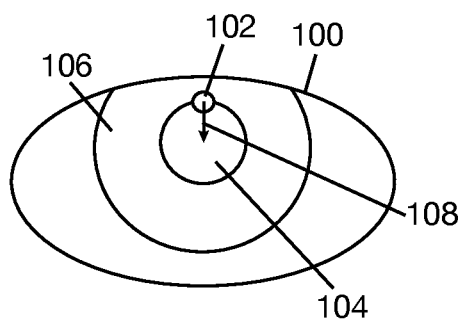

FIGS. 1A-1C illustrate an eye 100 illuminated with infrared light. A glint 102 appears as a bright spot on pupil 104 and/or iris 106 of eye 100. FIGS. 1A-1C show glint 102 at different positions on eye 100 depending on the gaze direction of eye 100. By detecting specular reflections of infrared light from eye 100 over a time period, changes in glint center position can be determined and used to determine changes in gaze position of eye 100 over the time period. When the infrared light used in illuminating the eye is provided by a WHUD, the position of the glint on the eye may also change with movements of the WHUD that are not accompanied by gaze movements. In this case, glint center position may not provide a reliable estimate of the gaze position. Using glint center position as a reference position, a glint-pupil vector joining the glint center and pupil center can be determined. FIGS. 1D and 1E show a glint-pupil vector 108 joining the centers of glint 102 and pupil 104. Glint-pupil vector 108 responds to changes in eye gaze. For some geometries, glint-pupil vector may be less sensitive to movements of the WHUD that are not accompanied by gaze movements. This may allow glint-pupil vector 108 to give a more reliable estimate of the gaze position when glint center position alone may not.

A method of tracking an eye of a user through a WHUD worn on the head of the user includes generating infrared light using select components of the WHUD, e.g., an infrared laser diode, scanning the infrared light over a region of the eye of the user using select components of the WHUD, e.g., an optical scanner and a transparent combiner, and detecting reflections of infrared light from the eye using select components of the WHUD, e.g., an infrared detector. The scanning of infrared light and detection of reflections of infrared light occur over an eye tracking period, which may, or may not, extend over a use period of the WHUD. In one implementation, the method of tracking eye gaze includes an edge detection process that runs generally continuously over the eye tracking period and an image capture process that may run at select times during the eye tracking period, such as at scheduled times during the eye tracking period and/or in response to an external stimulus, such as, for example, abrupt movements of the WHUD, large displacement of the WHUD from a home position, or a predetermined user interaction with the WHUD.

In one example, the edge detection process includes identifying glints from the output signal of the infrared detector by detecting the specular reflections of infrared light having an intensity that exceeds an intensity threshold. The rising edge, or the falling edge, or the centroid of the rising and falling edges of a specular reflection may be detected. Detecting the centroid of the rising and falling edges of a specular reflection may increase the reliability of the edge detection process in some cases, as will be discussed later. A plurality of glints may be identified from the output signal of the infrared detector over a given eye tracking period. Using scan orientation data from the optical scanner, the glint center positions in a glint space can be determined.

In one example, the image capture process includes reconstructing an image of the eye from the output signal of the infrared detector. Reconstructing an image of the eye may include obtaining the scan orientation for each detected reflection and mapping the measured reflection off the eye to a particular scan orientation. Pupil center may be obtained from the image of the eye. Glint center may also be obtained from the image of the eye, or from the edge detection process. Using the pupil center and glint center, a glint-pupil vector can be determined.

In one implementation, the edge detection process involves extracting sequential samples from the output signal of the infrared detector at a first sampling rate and identifying the glints from the samples, and the image capture process involves extracting sequential samples from the output signal of the infrared detector at a second sampling rate and reconstructing images of the eye from the samples, where the first sampling rate is higher than the second sampling rate. In a non-limiting example, the first sampling rate may be 100 MHz (i.e., clock frequency), and the second sampling rate may be 5 MHz. With these differential sampling rates, at least one image of the eye is reconstructed from the output signal of the infrared detector over the eye tracking period, whereas a plurality of glints is identified from the output signal of the infrared detector over the same eye tracking period. In general, image reconstruction of the eye from the output signal of the infrared detector is a more computationally intensive process than edge detection of intensity threshold from the output signal of the infrared detector. By allowing the image capture process to run less frequently than the edge detection process, an overall computationally economical eye tracking system that is suitable for mobile gaze aware applications may be achieved.

The infrared detector detects infrared light reflected off the eye and turns the detected reflection into an electrical signal. Whether the signal returning to the infrared detector is a specular reflection or a diffuse reflection, the infrared detector does the same thing, i.e., turns the detected light into an electrical signal. The specular reflection (glint) is a very strong and short duration signal that is easy to detect electrically and act on. The diffuse signal is significantly weaker and takes a different circuit/processing approach to turn into information that can be used to reconstruct the image of the eye. In the edge detection process, the glints are identified from the specular portion of the detected reflections. In the image capture process, the image of the eye is reconstructed from the diffuse portion of the detected reflections.

In one implementation of the method of eye tracking, glints are obtained from the edge detection process and used for eye tracking. In this case, the glints obtained from the edge detection process are in a glint space that is in the detector domain, whereas the gaze positions used for eye tracking are in a display space that is in the world domain. Thus, a mapping function is used to transform glint position coordinates in the glint space to gaze coordinates in the display space. The mapping function may be obtained by a first calibration process. The term "first" as used in "first calibration process" has no special meaning beyond keeping track of the calibration processes described in this disclosure. The first calibration process may make use of the previously described edge detection process.

Figure 2A:
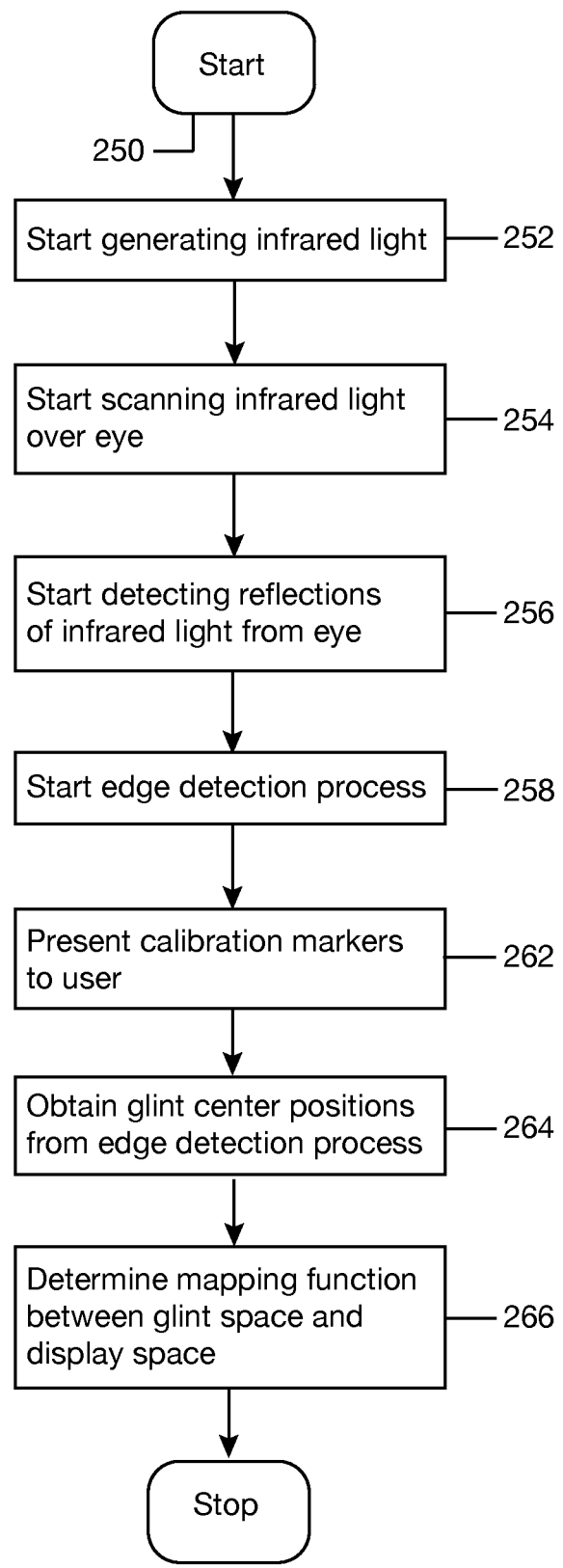
FIG. 2A is a flow diagram showing a calibration process for determining a mapping function between a glint space and a display space.

FIG. 2A is a flow diagram illustrating one example of the first calibration process. At 250, the first calibration process starts. This may include positioning the WHUD at the home position on the head of the user such that the display space is within a field of view of at least one eye of the user. At 252, generation of infrared light starts, e.g., using an infrared laser diode of the WHUD. At 254, scanning of the eye with the infrared light generated at 252 starts, e.g., using an optical scanner and a transparent combiner of the WHUD. At 256, detection of reflections of infrared light from the eye starts, e.g., using an infrared detector of the WHUD. At 258, an edge detection process starts. At 262, markers are presented at select positions in the display space in a predetermined sequence or pattern to the user, and the user is instructed to focus on the markers. At 264, glint center positions are obtained from the edge detection process. Thus, for each marker position in the display space, there is a corresponding glint center position in the glint space. At 266, from the marker positions in the display space and the corresponding glint center positions in the glint space, a mapping function F1 is determined between the glint space and the display space. A particular mapping function F1 is not disclosed herein because the mapping function is device- and/or user-dependent. However, mapping function F1 may be determined by, for example, applying geometric transformations, affine transformations, or neural networks to the glint center position and marker position data obtained as described above. Subsequently, any glint center position within the glint space may be transformed to a gaze position within the display space using mapping function F1.

In one implementation of the method of eye tracking, images of the eye may be obtained from the image capture process. From the images, pupil center positions can be extracted. Pupil center positions together with corresponding glint center positions can be used to compute glint-pupil vectors, which may be used directly or indirectly for eye tracking. The glint center positions corresponding to pupils extracted from the images of the eye may be obtained from the same images of the eye from which the pupils were extracted or from an edge detection process that is running generally simultaneously with the image capture process. As in the case of the glint space, the glint-pupil vector space is in the detector domain. Thus, a mapping function is used to transform coordinates in the glint-vector space to coordinates in the display space. The mapping function may be obtained by a second calibration process. Again, the term "second" as used in "second calibration process" has no special meaning beyond keeping track of the calibration processes described in this disclosure. The second calibration process may make use of the previously described image capture process and optionally the previously described edge detection process.

Figure 2B:
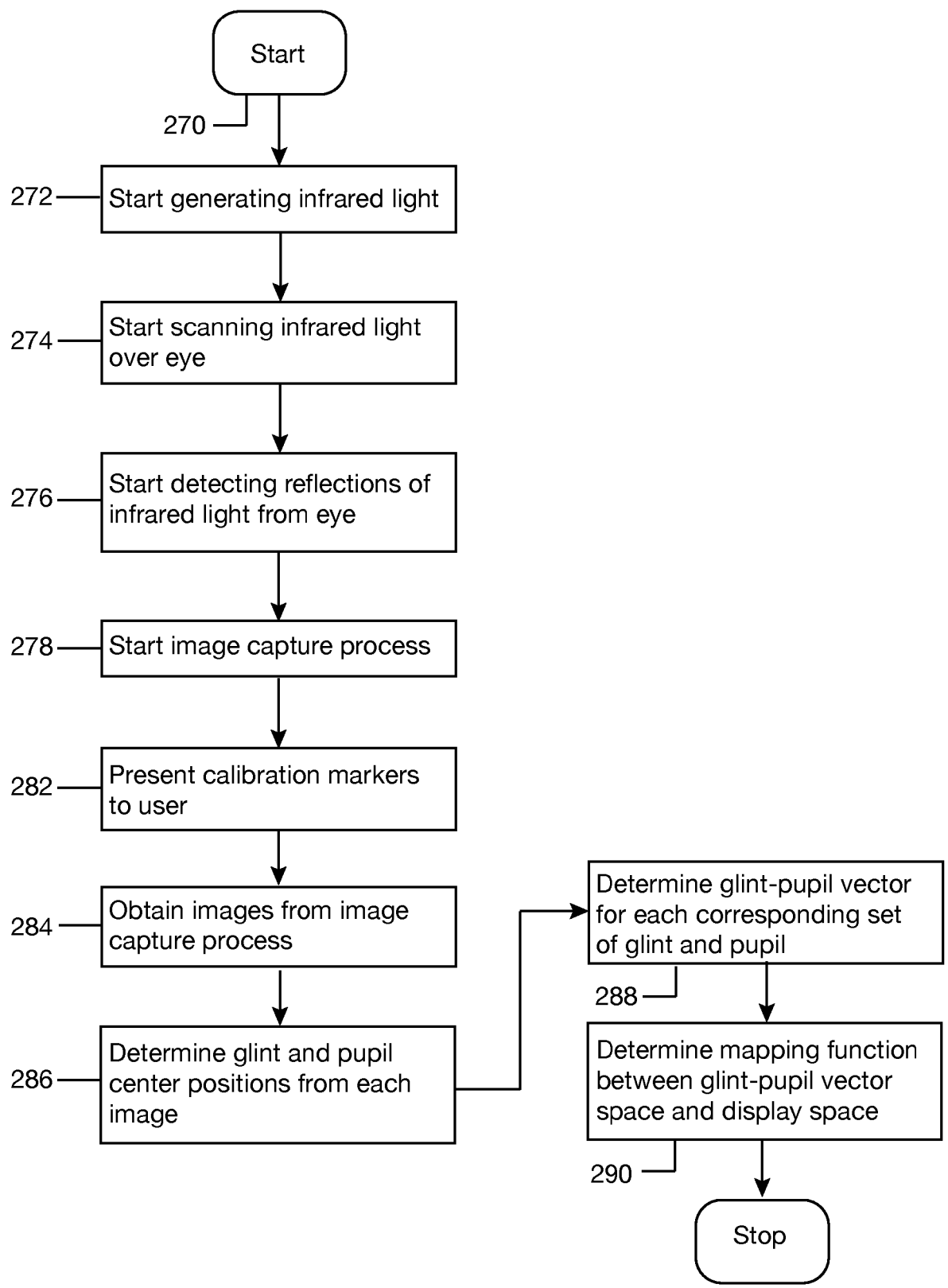
FIG. 2B is a flow diagram showing a calibration process for determining a mapping function between a glint-pupil vector space and a display space.

FIG. 2B is a flow diagram illustrating one example of the second calibration process. At 270, the second calibration process starts. This may include positioning the WHUD at the home position on the head of the user such that the display space is within a field of view of at least one eye of the user. At 272, generation of infrared light starts, e.g., using an infrared laser diode of the WHUD. At 274, scanning of the eye with the infrared light of 272 starts, e.g., using an optical scanner and a transparent combiner of the WHUD. At 276, detection of reflections of infrared light from the eye starts, e.g., using an infrared detector of the WHUD. At 278, an image capture process starts. At 282, calibration markers are presented at select positions in the display space in a predetermined sequence or pattern to the user. This may be the same sequence or pattern used in the first calibration process to determine mapping function F1. The user is instructed to focus on the calibration markers. At 284, images of the eye are obtained from the image capture process of 278. At 286, from each image obtained at 284, at least one glint and a pupil are extracted, and the glint center position and pupil center position of the glint and pupil, respectively, are determined. At 288, for each image obtained at 284, a glint-pupil vector is determined from the glint center position and pupil center position obtained at 286. Thus, for each marker position in the display space, there is a corresponding glint-pupil vector in the glint-pupil vector space. At 290, using the calibration marker positions in the display space and the corresponding glint-pupil vectors in the glint-pupil vector space, a mapping function F2 is determined between the glint-pupil vector space and the display space. A particular mapping function F2 is not disclosed herein because the mapping function is device- and/or user-dependent. However, mapping function F2 may be determined by, for example, applying geometric transformations, affine transformations, or neural networks to the glint-pupil vector and marker position data obtained as described above. Subsequently, any glint-pupil vector within the glint-pupil vector space may be transformed to a gaze position within the display space using mapping function F2.

The first and second calibration processes may be performed separately as described above. Alternatively, the first and second calibration processes may be combined into a single calibration process. That is, the processes shown in FIGS. 2A and 2B can be combined, without duplication of common sub-process. For example, in a single calibration process, only one "start generating infrared light" would be needed. Edge detection process and image capture process can be run generally simultaneously during the single calibration process in which the user focuses on calibration markers presented in a display space. Glint center positions obtained from the edge detection process can be used for determining mapping function F1 as previously described, and images of the eye obtained from the image capture process can be used to determine glint-pupil vectors, which can be used for determining mapping function F2 as previously described.

The calibration processes described above are intended to be performed infrequently and may not necessarily precede every eye tracking process. Typically, the calibration processes may be performed when a user first starts using the WHUD or when the WHUD system has been updated or has been reset.

Figure 2C:
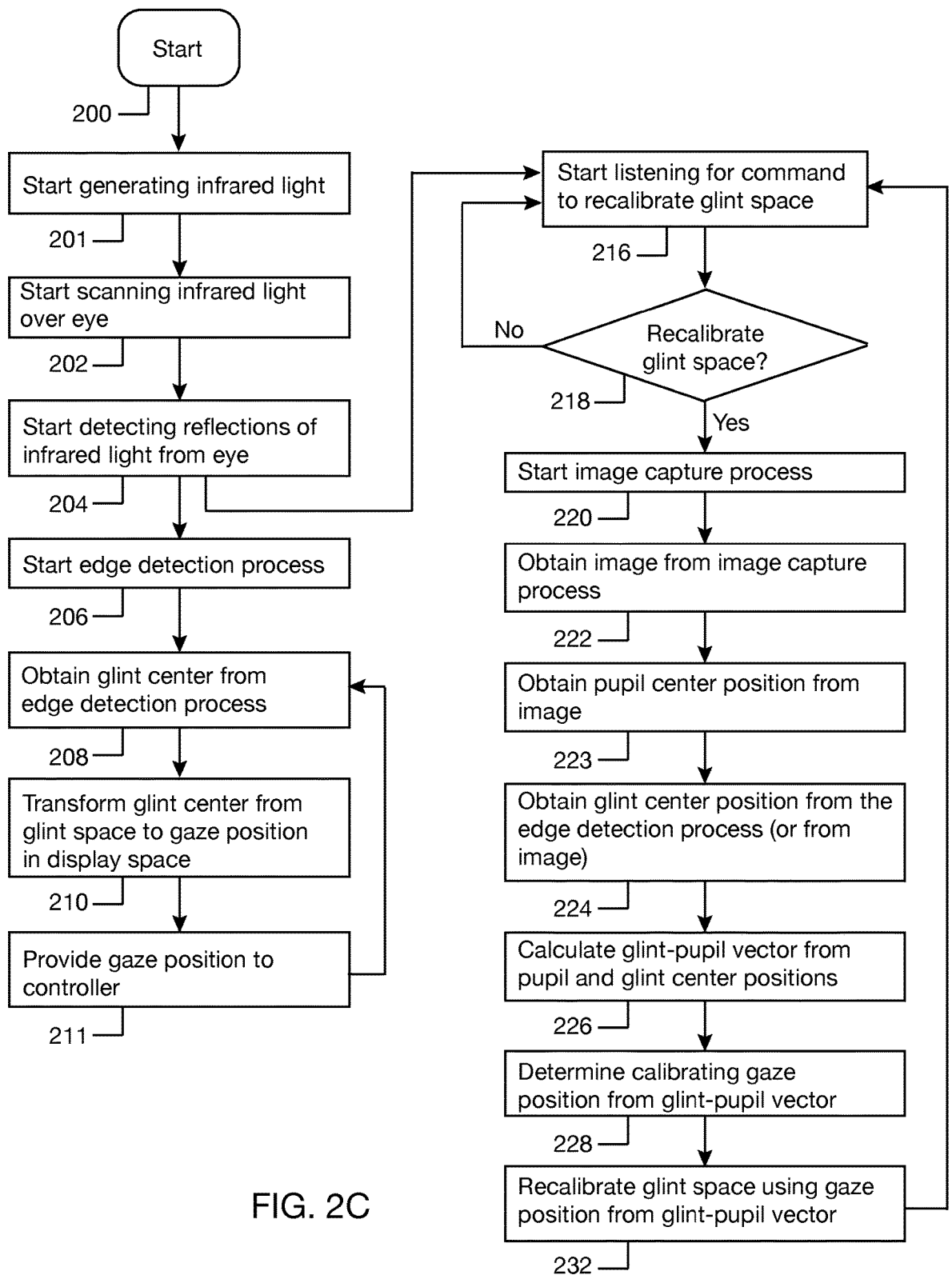
FIG. 2C is a flow diagram showing a method of tracking eye gaze.

FIG. 2C is a flow diagram illustrating one implementation of the method of tracking an eye of a user. At 200, the eye tracking process starts. If the user is not already wearing a WHUD, the start of the eye tracking process may include the user placing the WHUD on the head. At 201, generation of infrared light starts, e.g., using an infrared laser diode of the WHUD. The infrared light may be generated over an eye tracking period T. At 202, scanning of the eye with the infrared light generated at 201 starts, e.g., using an optical scanner of the scanning light projector and a transparent combiner of the WHUD. Scanning of the eye with infrared light of 202 may be over the eye tracking period T and may generally occur alongside generating the infrared light of 201. At 204, detection of reflections of infrared light from the eye starts, e.g., using an infrared detector of the WHUD. Detection of reflections of infrared light from the eye may be over the eye tracking period T. At 206, an edge detection process, as previously explained, starts. The edge detection process may run generally continuously over the eye tracking period T. A plurality of glints may be identified from the output signal of the infrared detector over the eye tracking period T. At 208, a glint center position is obtained from the edge detection process. At 210, the glint center position is transformed from a glint space to a gaze position in a display space using mapping function F1. At 211, the eye tracking process sends the gaze position to the controller of the WHUD. The controller upon receiving the gaze position may adjust display content in a field of view of the user based on gaze position. Adjustment of display content may include any of modifying the display content, selecting a portion or all of the display content, moving a portion or all of the display content to where the user is looking, and removing a portion or all of the display content, e.g., if the user is not looking at a target area or anywhere within the display space. After sending the gaze position to the controller, the eye tracking process returns to 208. The eye tracking process can simply continue obtaining a new gaze position and sending the new gaze position until interrupted, e.g., by the controller of the WHUD or by loss of power or by some other external stimulus. Each of 208, 210, and 211 may be performed by a processor.

At 216, the eye tracking process starts listening for a command to recalibrate the glint space. Listening for a command to recalibrate the glint space may begin as soon as detection of reflections of infrared light from the eye, i.e., 204, begins. The command to update the glint space may come from the controller of the WHUD at select time intervals during the eye tracking period and/or in response to an external stimulus during the eye tracking period, such as, for example, abrupt movements of the WHUD, large displacement of the WHUD from a home position, or a predetermined user interaction with the WHUD, e.g., if the user initiates an action that requires accurate gaze position information. At 218, a check is made to see if it is time to recalibrate the glint space. If it is time to recalibrate the glint space, the image capture process, as previously explained, starts at 220. At 222, an image of the eye is obtained from the image capture process. At 223, a pupil center is obtained from the image, and the position of the pupil center is determined. At 224, a glint center position is obtained from a glint identified from the edge detection process. The glint whose glint center position is obtained from the edge detection process should correspond in space to the pupil whose pupil center position is obtained from the image capture process. The term "corresponding in space" generally means that the glint and pupil should belong to the same image of the eye. Since the image capture process and edge detection process occur at different sampling rates, downsampling may be used to obtain the glint center position that corresponds in space to the pupil center position. Alternatively, the glint center position may be obtained from the same image from which the pupil center position was extracted, i.e., the image obtained at 222. At 226, the pupil center position obtained at 222 and the glint center position obtained at 224 are used to calculate a glint-pupil vector.

At 228, the glint-pupil vector from 226 is transformed from a glint-pupil vector space to a "calibrating gaze position" in the display space using mapping function F2 that transforms coordinates in the glint-pupil vector space to coordinates in the display. The term "calibrating gaze position" refers to the gaze position that will be used in recalibrating the glint space and that is determined in response to a command to recalibrate the glint space. The calibrating gaze position is determined by mapping a glint-pupil vector from a glint-pupil vector space to a gaze position in the display space using, for example, mapping function F2. A gaze position may be calculated from the glint center position obtained at 224 and compared to the gaze position calculated from the glint-pupil vector. If there is any inconsistency between the two gaze positions, the gaze position from the glint-pupil vector is deemed to be more accurate than the gaze position from the glint center position, e.g., because the glint-pupil vector is less sensitive to movements in the WHUD that are not accompanied by gaze movements. For this reason, the glint space is typically automatically recalibrated based on the calibrating gaze position determined from the glint-pupil vector. At 232, the glint space is recalibrated using the gaze calibrating position. In general, recalibrating the glint space means applying an offset to the mapping function F1 such that the gaze position obtained from the glint-pupil vector is consistent with the gaze position obtained from the glint center position. However, a more complex recalibration process may be carried out that involves recalculating the mapping function itself. Recalibrating the glint space includes providing the offset to mapping function F1, or a recalculated mapping function F1, to the gaze position calculator used at 210—the gaze position calculator will use the provided information for subsequent calculations of gaze position. Each of 216, 218, 220, 223, 224, 226, 228, and 232 may be performed by a processor.

Figure 3A:
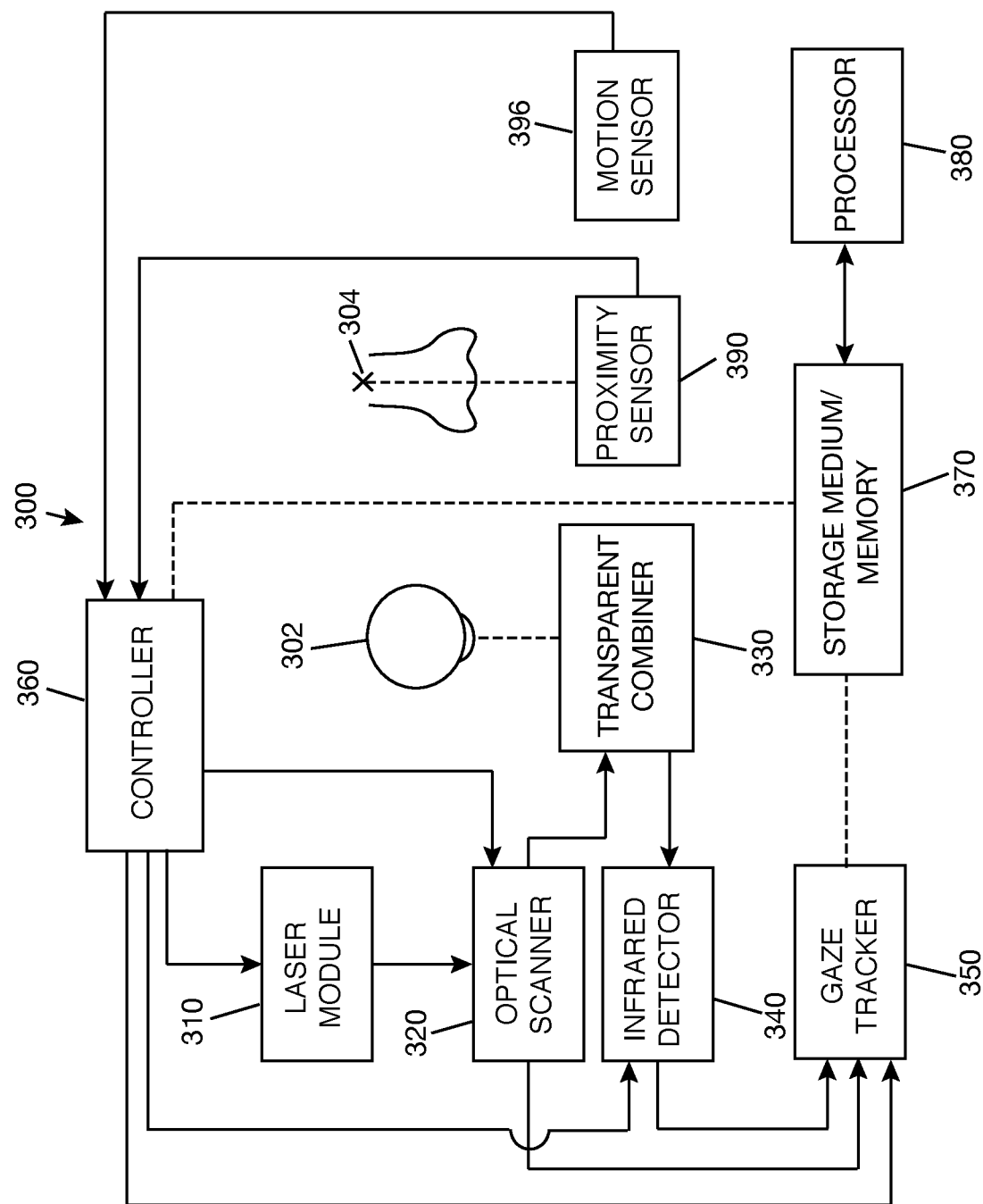
FIG. 3A is a block diagram showing an eye tracking system.

FIG. 3A is a block diagram illustrating an example eye tracking system 300 that may be used in practice of the method described above. All of the components of the eye tracking system 300 may be incorporated into a WHUD. Eye tracking system 300 includes a laser module 310 that provides infrared light for eye tracking. Laser module 310 may also provide visible light for content display to the user. Eye tracking system 300 includes an optical scanner 320 that scans infrared light from laser module 310 over an eye 302 of the user of the WHUD. Optical scanner 320 may also scan visible light from laser module 310 over eye 302. Eye tracking system 300 may include a transparent combiner 330 that is aligned to receive infrared light from optical scanner 320 and redirect the infrared light to eye 302. Transparent combiner 330 includes at least one optical element that is responsive to the infrared light, such as an infrared hologram or a hot mirror. Transparent combiner 330 is transparent to some optical wavelengths of electromagnetic energy, e.g., wavelengths in the visible range. Transparent combiner 330 may also receive visible light from optical scanner 320 and redirect the visible light to eye 302. For this purpose, transparent combiner 330 may further include at least one optical element that is responsive to visible light or that can receive visible light from optical scanner 320 and redirect the visible light to eye 302, such as visible hologram(s) or a lightguide.

Figure 3B:
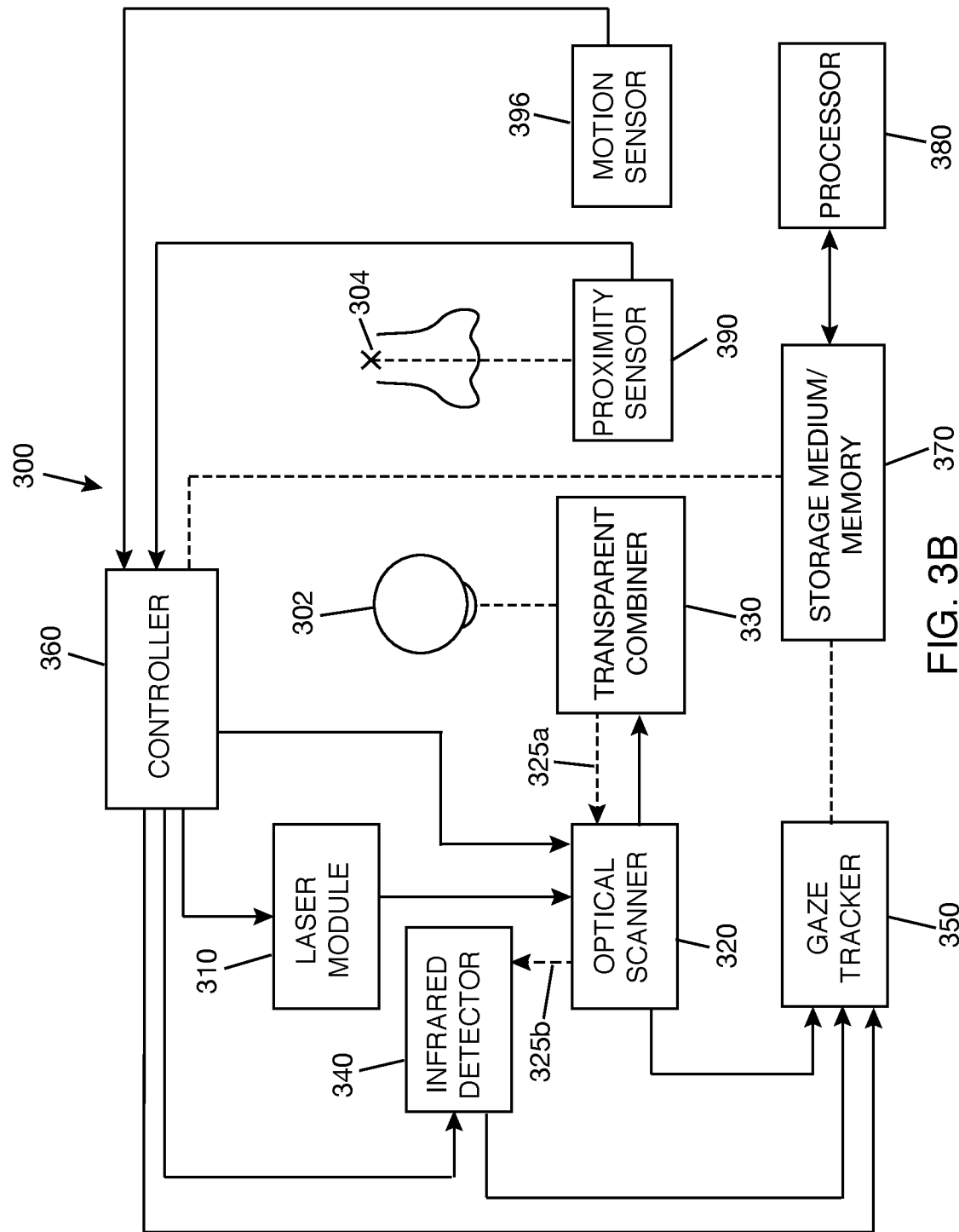
FIG. 3B is a block diagram showing an eye tracking system according to another implementation.

Eye tracking system 300 includes an infrared detector 340 that is aligned to detect reflections of infrared light from eye 302. FIG. 3A shows the infrared light coming off the transparent combiner 330 and going directly to the infrared detector 340. In another implementation, infrared light may come off the transparent combiner 330 and go back through the optical scanner 320 before being detected by the infrared detector 340, as shown in FIG. 3B by dashed lines 32a, 325b. Returning to FIG. 3A, eye tracking system 300 includes a gaze tracker 350 that determines changes in gaze position of eye 302 due to movements of eye 302. Gaze tracker 350 receives input from infrared detector 340, optical scanner 320, and a controller 360.

Controller 360 of eye tracking system 300 communicates with laser module 310, optical scanner 320, infrared detector 340, and gaze tracker 350 and generally coordinates operation of the eye tracking system. Controller 360 may be implemented in any combination of hardware and/or software.

Eye tracking system 300 may include non-transitory processor-readable storage medium or memory 370 and one or more processors, e.g., processor 380, to execute processor-executable instructions stored in memory 370. In one example, memory 370 contains processor-executable instructions related to operation of gaze tracker 350. In one example, memory 370 also contains processor-executable instructions related to operation of controller 360. Memory 370 may also contain data from various components of the eye tracking system 300 and/or data related to operation of the eye tracking system 300.

Eye tracking system 300 may include auxiliary sensors, e.g., a proximity sensor 390 and/or a motion sensor 396, to measure parameters related to movement of the WHUD or position of the WHUD relative to a home position. For example, proximity sensor 390 may measure proximity of a front frame of the WHUD relative to a spot 304, e.g., the sellion, on a head of the user. Motion sensor 396 may measure motion, such as acceleration, rotational rate, and the like, of a support frame of the WHUD. The auxiliary sensors, e.g., proximity sensor 390 and/or motion sensor 396, may communicate with controller 360. For example, controller 360 may receive sensor data from the auxiliary sensors, e.g., proximity sensor 390 and/or motion sensor 396, and use the sensor data to decide whether the gaze tracker 350 should recalibrate the glint space or take some other action. Although not shown, the auxiliary sensors may also communicate directly with gaze tracker 350.

Figure 3C:
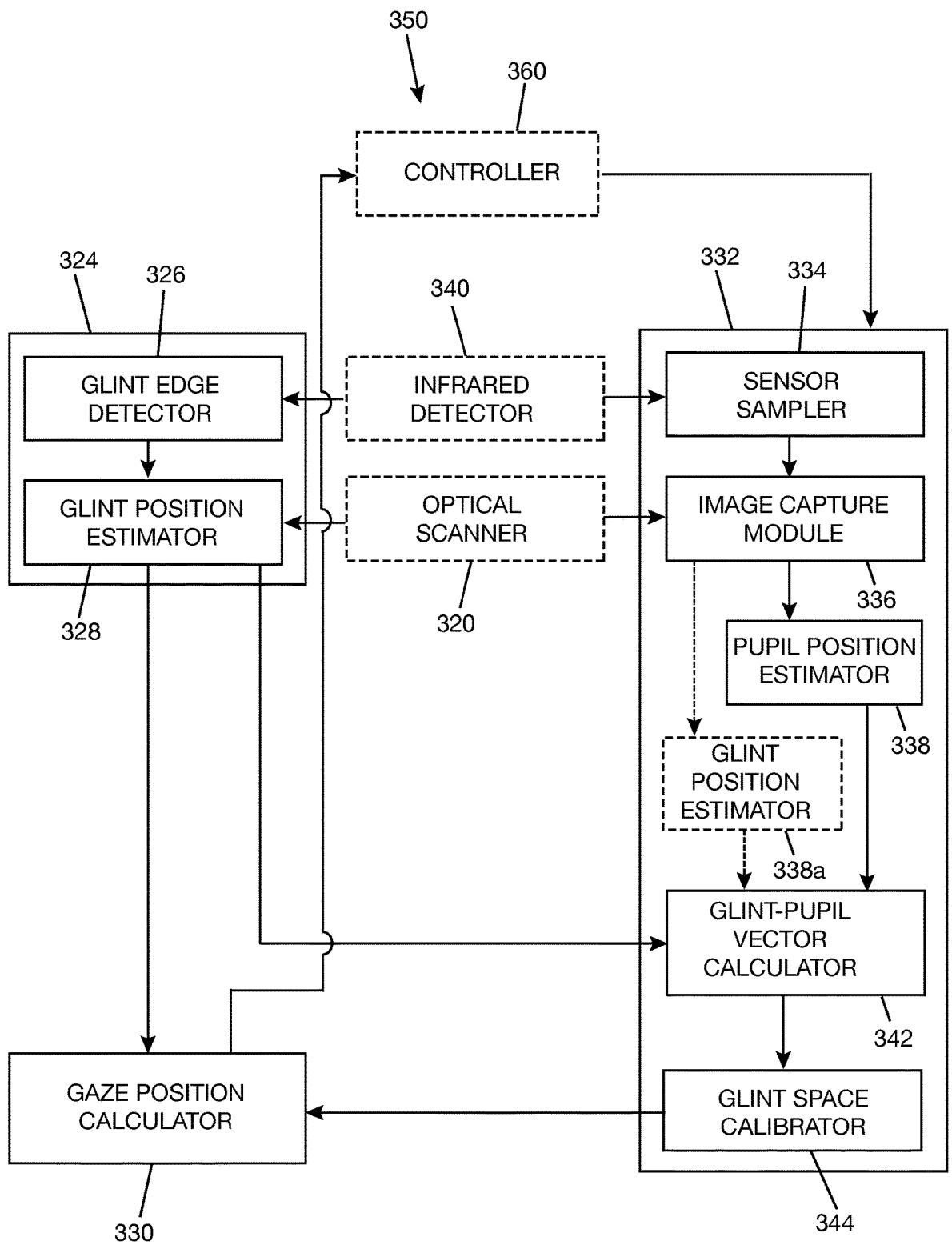
FIG. 3C is a block diagram showing a gaze tracker.

FIG. 3C is a block diagram illustrating components of the gaze tracker 350 according to one example. However, this example is not considered as limiting since there are various ways of configuring the gaze tracker 350 to achieve the eye tracking purposes described above. The components of the gaze tracker 350 may be implemented in any combination of hardware and/or software. Gaze tracker 350 may include a glint detection module 324 having a glint edge detector 326 that detects glint from an output signal of the infrared detector 340 by edge detection and a glint position estimator 328 that determines the glint center position of the detected glints relative to the glint space. Glint edge detector 326 is communicatively coupled to an output signal of the infrared detector 340 that detects reflections of infrared light from an eye. In one non-limiting example, glint edge detector 326 is implemented in hardware such that glints are edge-detected by hardware threshold, although this does not preclude implementing the glint edge detector 326, or parts thereof, in software. Glint position estimator 328 is communicatively coupled to optical scanner 320 to receive scan orientation information from optical scanner 320. Scan orientation may be, for example, mirror orientation, if the optical scanner 320 is implemented as at least one scan mirror. Each scan orientation may include position values along two orthogonal axes identifying the coordinate of the at least one scan mirror in the scan orientation space (or mirror orientation space).

Infrared detector 340 detects reflections from the eye and outputs a signal having an intensity profile that is representative of the detected reflections. In one implementation, glint edge detector 326 detects when the intensity of the output signal of the infrared detector 340 exceeds an intensity threshold. In one example, the intensity threshold is selected such that reflections from the eye having intensities exceeding the intensity threshold are presumed to come from glints on the eye. From the output signal of the infrared detector 340, glint edge detector 326 may detect only the rising edge, or only the falling edge, or the centroid of the rising and falling edges of an intensity profile of each reflection having an intensity exceeding the intensity threshold. Tracking the centroid of the rising and falling edges of an intensity profile of a reflection may enable a glint detection process that is less sensitive to shifts in infrared laser wavelength due to drifts in temperature of the infrared laser diode. For instance, as the temperature of the infrared laser diode increases, the wavelength of the infrared light generated by the infrared laser diode will shift, changing the amount of light the transparent combiner (330 in FIG. 3A) redirects towards the eye, which effectively reduces the brightness of the infrared light illuminating the eye (302 in FIG. 3A). If the infrared light brightness is reduced, the centroid of the glint will remain in the same position, but the overall size of the glint radius will be reduced. Therefore, the rising and falling edges will shift closer to the center of the glint. If the rising edges or the falling edges are tracked independently, then the glint would appear to have shifted. However, if the centroid of the rising and falling edges is tracked, the glint will remain in the same position, i.e., the glint will not shift due to changes in the brightness of the infrared light.

Figure 3D:
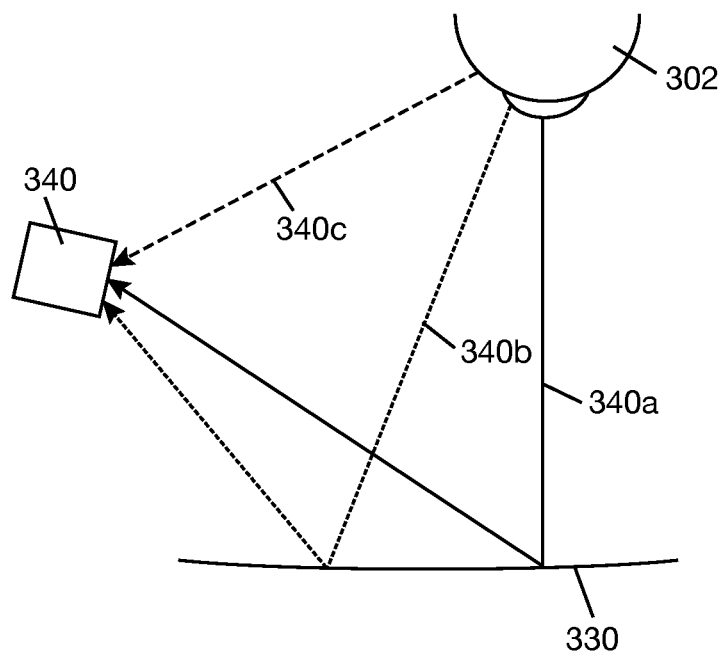
FIG. 3D is a schematic diagram showing detection of reflection of infrared light from an eye along multiple paths.

Glint edge detector 326 outputs sample frames at a select sampling rate to the glint position estimator 328. Each sample frame may correspond to one sweep of infrared light over the eye. Typically, each sample frame will contain at least one glint. In some cases, the sample frame may contain multiple glints from different sources. For example, multiple glints may be detected during a sweep of the infrared light over the eye due to reflections from the eye reaching the infrared detector 340 from multiple directions. FIG. 3D illustrates an example of three paths 340a, 340b, and 340c through which reflection of infrared light from eye 302 may reach infrared detector 340. Each of these reflections may be detected as a glint. Since the reflections reach the infrared detector 340 through different paths, it may be possible to distinguish between the reflections by intensity and/or time of arrival at the detector. The glint edge detector (326 in FIG. 3C) may select one of the reflections for inclusion in a frame based on intensity and/or time of arrival. Alternatively, the glint edge detector 326 may include the multiple glints from the different sources (i.e., different reflection paths) in a frame.

If a frame contains multiple glints from different sources, each glint will be in a different region of the glint space compared to the others. To use the multiple glints in eye tracking, a method that combines the gaze position from the multiple glints is used. Examples of methods that combine gaze position from multiple glints are illustrated in FIGS. 3E-3G.

Figure 3E:
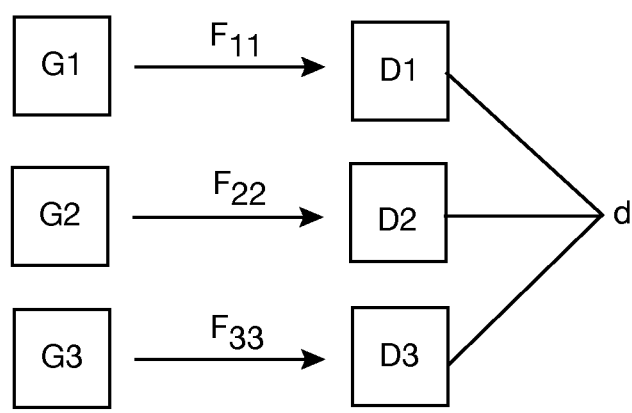
FIG. 3E is a block diagram showing mapping of coordinates from multiple glint spaces to multiple display spaces.

FIG. 3E shows a scheme where mapping functions $F_{11}$, $F_{22}$, $F_{33}$ are determined to transform coordinates in glint space regions G1, G2, G3 to coordinates in display space regions D1, D2, and D3, respectively. The gaze position in the display space regions D1, D2, D3 may be averaged, or otherwise combined, to obtain a final gaze position, d, for eye tracking.

Figure 3F:
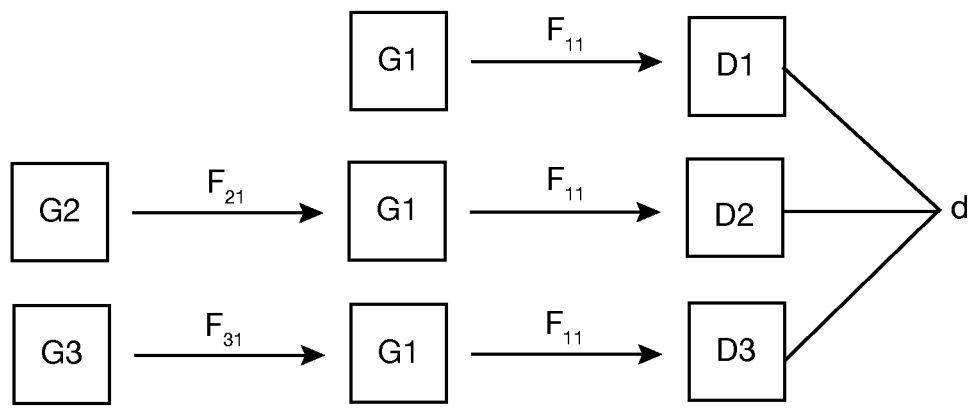
FIG. 3F is a block diagram showing mapping of coordinates between different glint spaces and between multiple glint spaces and multiple display spaces.

FIG. 3F shows an alternate scheme involving glint space region to glint space region mapping. In FIG. 3F, coordinates in glint space region G1 are transformed to coordinates in display space region D1 by mapping function $F_{11}$. Coordinates in glint space region G2 are transformed to coordinates in glint space region G1 by mapping function $F_{21}$ and from glint space region G1 to display space region D2 by mapping function $F_{11}$. Coordinates in glint space region G3 are transformed to coordinates in glint space region G1 by mapping function $F_{31}$ and from glint space region G1 to coordinates in display space region D3 by mapping function $F_{11}$. The gaze positions in the display space regions D1, D2, D3 may then be combined to obtain a final gaze position, d, for eye tracking.

Figure 3G:
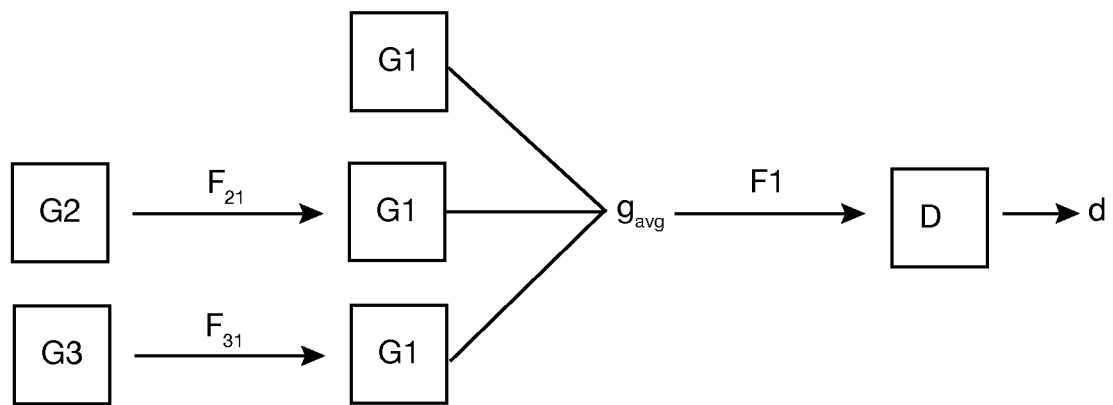
FIG. 3G is a block diagram showing mapping of coordinates between different glint spaces and between a combined glint space and a display space.

FIG. 3G shows another scheme where coordinates in glint space region G2 are transformed to coordinates in glint space region G1 by mapping function $F_{21}$ and coordinates in glint space region G3 are transformed to coordinates in glint space region G1 by mapping function $F_{31}$. Glint center positions from the three instances of glint space region G1 are combined, e.g., by averaging. The combined glint center position, $g_{avg}$, is transformed to a gaze position, d, in display space D by mapping function F1.

Each of the various mapping functions in FIGS. 3E to 3G may be determined using the calibration process described for determining mapping function F1 in FIG. 2A.

Another scheme not shown in the drawings may include nonlinear mapping of the multiple glints to a gaze position in the display space. Machine learning may be used to determine the nonlinear mapping.

Returning to FIG. 3C, glint position estimator 328 receives detector output signal sample frames from glint edge detector 326 and scan orientations corresponding to the frames from optical scanner 320. Glint position estimator 328 processes the frames one at a time to identify at least one glint in the frame. Glint position estimator 328 determines the scan orientation corresponding to the glint. Glint position estimator 328 transforms the scan orientation corresponding to the glint from the scan orientation space to the detected reflection space to obtain the glint center position in the glint space. If the frame contains multiple glints, glint position estimator 328 may determine the glint center position for each glint as described above.

In practice, glint detection module 324 may start operating as soon as infrared detector 340 starts outputting a signal or in response to a command from controller 360. Glint detection module 324 may operate generally continuously over an eye tracking period or at select time intervals within the eye tracking period.

Gaze tracker 350 includes a gaze position calculator 330 that receives glint center positions from glint position estimator 328 and transforms the glint center positions from the glint space to gaze positions in the display space. The gaze position calculator 330 may receive one glint center position for each frame processed by the glint position estimator 328 and transform the glint center position to a gaze position in the display space using, for example, mapping function F1. Alternatively, the gaze position calculator 330 may receive multiple glint center positions for each frame processed by the glint position estimator 328 and transform the multiple glint center positions to a gaze position in the display space using a scheme such as shown in any of FIGS. 3E, 3F, and 3G.

Returning to FIG. 3C, gaze tracker 350 includes a glint recalibration module 332 that recalibrates the glint space at scheduled times and/or in response to an external stimulus. Glint recalibration module 332 may receive a command from controller 360 to recalibrate the glint space. Glint recalibration module 332 includes a sensor sampler 334 that receives samples from the output signal of the infrared detector 340, an image capture module 336 that reconstructs images of the eye from the samples, a pupil position estimator 338 that determines the pupil center position from each image, a glint-pupil vector calculator 342 that calculates a glint-pupil vector, and a glint space calibrator 344 that recalibrates the glint space based on the glint-pupil vector.

In operation, sensor sampler 334 receives samples from the output signal of infrared detector 340 and outputs sample frames to image capture module 336. Image capture module 336 processes the sample frames one at a time to reconstruct an image of the eye. Each sample frame contains a sequence of samples, where each sample may represent a pixel on the image. Image capture module 336 also receives scan orientations from the optical scanner 320. The scan orientation corresponding to each sample is used to locate the pixel representing the sample on the image. Pupil position estimator 338 receives images from the image capture module 336 and processes each image to identify the pupil in the image. The pupil may be identified using image processing or convolutional neural network techniques. Pupil position estimator 338 determines the center position of the identified pupil.

In one example, glint-pupil vector calculator 342 receives glint center positions from the glint position estimator 328 based on samples obtained from the output signal of the infrared detector 340 at a first sampling rate and pupil center positions from the pupil position estimator 338 based on samples obtained from the output signal of the infrared detector 340 at a second sampling rate. In one example, the first sampling rate is higher than the second sampling rate, and down-sampling is used to match the coordinate space of a glint center position received from the glint position estimator 328 to the coordinate space of a pupil center position received from the pupil position estimator 338. Glint-pupil vector calculator 342 uses each corresponding glint center position and pupil center position to determine a glint-pupil vector. As an alternative to receiving glint center positions from the glint position estimator 328, glint recalibration module 332 may include a glint position estimator 338a that receives images from the image capture module 336, extracts at least one glint from each image, and determines the glint center position of the at least one glint extracted from the image. In this alternative case, the glint-pupil vector calculator 342 will use the pupil center position from the pupil position estimator 338 and the glint center position from the glint position estimator 338a to calculate the glint-pupil vector. The functionality of the pupil position estimator 338 and glint position estimator 338a may also be included in the glint-pupil vector calculator 342 such that the glint-pupil vector calculator 342 receives images directly from the image capture module 336 and computes the glint-pupil vector from each image.

Glint space calibrator 344 receives the glint-pupil vector from glint-pupil vector calculator 342. Glint space calibrator 344 then determines "calibration gaze position" from the glint-pupil vector using mapping function F2 and uses the calibration gaze position to recalibrate the glint space, e.g., by applying an offset to mapping function F1. Glint space calibrator 344 provides the updated mapping function F1 to gaze position calculator 330, which uses the updated mapping function F1 in subsequent gaze position calculations. Providing the updated mapping function F1 to gaze position calculator 330 may include any of providing the offset to be applied to the mapping function F1, providing mapping function F1' that already includes the offset, or providing a recalculated mapping function F1". Gaze position calculator 330 may communicate each new gaze position to controller 360, which may use the new gaze position to adjust display content in a field of view of the user.

Figure 4A:
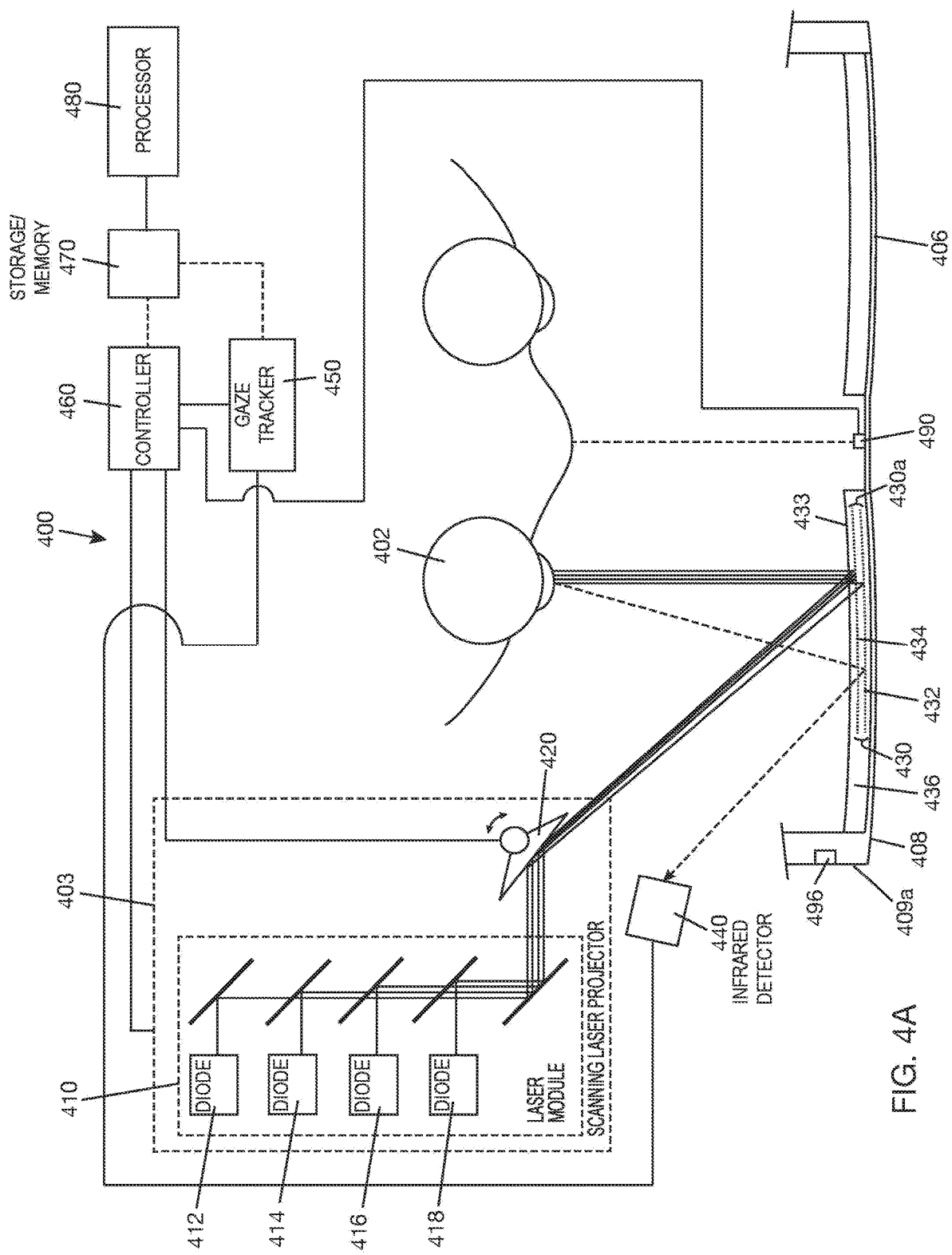
FIG. 4A is a schematic diagram showing a system for displaying content and eye tracking.

FIG. 4A is an illustrative diagram of a system 400 that integrates content display and eye tracking. System 400 includes a scanning laser projector 403 that is operable to scan infrared light and visible light over a target area. In general, the infrared light is used for eye tracking, and the visible light is used for displaying content to the user. Scanning laser projector 403 includes a laser module 410 (corresponding to laser module 310 in FIG. 3A) and optical scanner 420 (corresponding to optical scanner 320 in FIG. 3A). Laser module 410 includes an infrared laser diode 412 to provide infrared light and visible laser diodes 414, 416, and 418 to provide visible light. In general, laser module 410 may have any number and combination of laser diodes to provide infrared light and visible light. In one example, visible laser diodes 414, 416, and 418 provide visible light in different narrow wavebands. In one example, visible laser diodes 414, 416, and 418 are green laser diode, blue laser diode, and red laser diode, respectively. Laser module 410 may include optics to combine the output beams of the multiple laser diodes into a single combined beam. Infrared laser diode 412 may provide a continuous beam of infrared light or may be modulated, e.g., by controller 460 (corresponding to controller 360 in FIG. 3A), to generate a sequence or pattern of infrared light. Similarly, visible laser diodes 414, 416, and 418 may provide a continuous beam of visible light or may be modulated, e.g., by controller 460, to generate a sequence or pattern of visible light.

Optical scanner 420 is positioned, oriented, and operable to receive an illumination spot including infrared light and visible light from laser module 410 and scan the illumination spot across a region of eye 402. In one example, optical scanner 420 may be a scan mirror, hereafter referred to as scan mirror 420. In general, scan mirror 420 is a mirror or reflector capable of scanning light over a surface. In one example, scan mirror 420 may be a two-dimensional scan mirror operable to scan in two directions, for example by oscillating or rotating with respect to two axes. In another example, scan mirror 420 may be two orthogonally-oriented mono-axis mirrors. The mirrors included in scan mirror 420 may be microelectromechanical systems (MEMS) mirrors, piezoelectric mirrors, and the like. In another implementation, scanning laser projector 403 may have more than one scan mirror 420. In another implementation, scanning laser projector 403 may use a mirrorless optical scanner, such as fiber optic scanner, or a combination of mirror and mirrorless optical scanning elements.

Controller 460 may control infrared laser diode 412 and visible laser diodes 414, 416, and 418 to provide a select modulation of infrared light and visible light, respectively, to the scan mirror 420. Depending on the modulation of the infrared laser diode 412 and visible laser diodes 414, 416, and 418, scan mirror 420 may scan each of infrared light and visible light over a substantially continuous surface of eye 402 or may scan each of infrared light and visible light to form an illumination pattern, such as grid pattern, crosshairs pattern, and the like, on the surface of eye 402. Generally, in order for scan mirror 420 to scan each of infrared light and visible light over eye 402, scan mirror 420 may sweep through a range of orientations. For a plurality of orientations of scan mirror 420, scan mirror 420 may receive infrared light from infrared laser diode 412 and visible light from visible laser diodes 414, 416, and 418 and reflect the infrared light and visible light into a respective region of eye 402.

System 400 includes an optical combiner lens 433, which includes a transparent combiner 430 (corresponding to transparent combiner 330 in FIG. 3A) that is aligned to receive infrared light and visible light from scan mirror 420 and to redirect the infrared light and visible light to eye 402. In one example, transparent combiner 430 includes a wavelength-multiplexed holographic optical element (HOE) 430*a*. Wavelength-multiplexed HOE 430*a* is an optical element that is produced using holographic principles and processes. In one implementation, wavelength-multiplexed HOE 430*a* includes at least one infrared hologram 432 that is responsive to infrared light and unresponsive to visible light and at least one visible hologram 434 that is responsive to visible light and unresponsive to infrared light. "Responsive," herein, means that the hologram redirects at least a portion of the light, where the magnitude of the portion depends on the playback efficiency of the hologram. "Unresponsive," herein, means that the hologram transmits the light, generally without modifying the light. Infrared hologram 432 may be responsive to the entire infrared range or to a subset of the infrared range. Similarly, visible hologram 434 may be responsive to the entire visible range or to a subset of the visible range. In examples, HOE 430*a* may include a visible hologram that is responsive to red light, a visible hologram that is responsive to green light, and a visible hologram that is responsive to blue light. In one implementation, the holograms 432, 434 are encoded, carried, embedded in or on, or otherwise generally included in a single volume of holographic material, e.g., photopolymer and/or a silver halide compound. In another example, transparent combiner 430 may be other optical structure besides HOE, such as a lightguide or waveguide, although HOE may still be used for the purpose of coupling light into and out of the transparent combiner.

Optical combiner lens 433 includes a transparent lens 436. Transparent combiner 430, or HOE 430*a*, is integrated with transparent lens 436, e.g., by embedding transparent combiner 430 in lens 436 or otherwise attaching transparent combiner 430 to lens 436. Optical combiner lens 433 is coupled to a support frame 406 of the WHUD such that when the WHUD is worn on the head of the user, transparent combiner 430 (HOE 430*a*) is positioned within a field of view of the eye 402. In examples, transparent combiner 430 (HOE 430*a*) is transparent to environmental light.

Figure 4B:
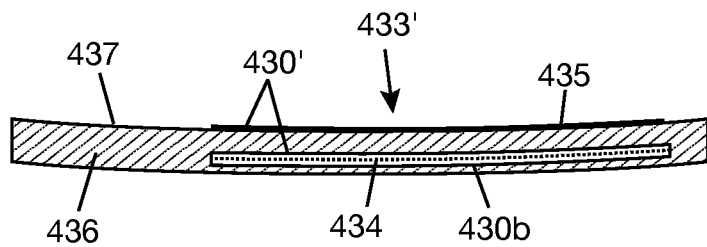
FIG. 4B is a cross-sectional view of a holographic optical element and a hot mirror integrated with a lens.

FIG. 4B shows an alternative optical combiner lens 433' that may be used instead of optical combiner lens 433 in FIG. 4A. Optical combiner lens 433' includes a transparent combiner 430' that is integrated with transparent lens 436. Transparent combiner 430' includes a HOE 430*b* and a hot mirror 435. HOE 430*b* includes at least one visible hologram 434. In some examples, HOE 430*b* may include a visible hologram that is responsible to red light, a visible hologram that is responsive to green light, and a visible hologram that is responsible to blue light. Hot mirror 435 is a dielectric mirror, or a dichroic filter, that reflects infrared light back from a light source while allowing visible light to pass through. Thus, hot mirror 435 may be considered to be responsive to infrared light and unresponsive to visible light. Hot mirror 435 may be transparent in the visible range. Hot mirror 435 is used instead of an infrared hologram (432 in FIG. 4A) to redirect infrared light that is received at optical combiner lens 433' towards the eye. Hot mirror 435 may be a coating or film that is applied on a surface 437 of lens 436. Surface 437 may be on the eye side of lens 436.

Figures 1, 4C:
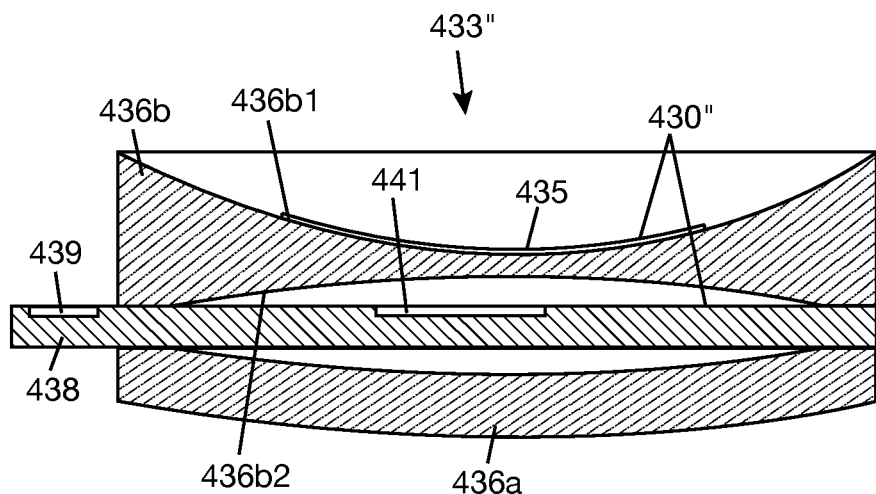
FIG. 4C-1 is a cross-sectional view of a lightguide and a hot mirror integrated with an eye side lens and world side lens, with the hot mirror on an inner surface of the eye side lens.
Figures 2, 4C:
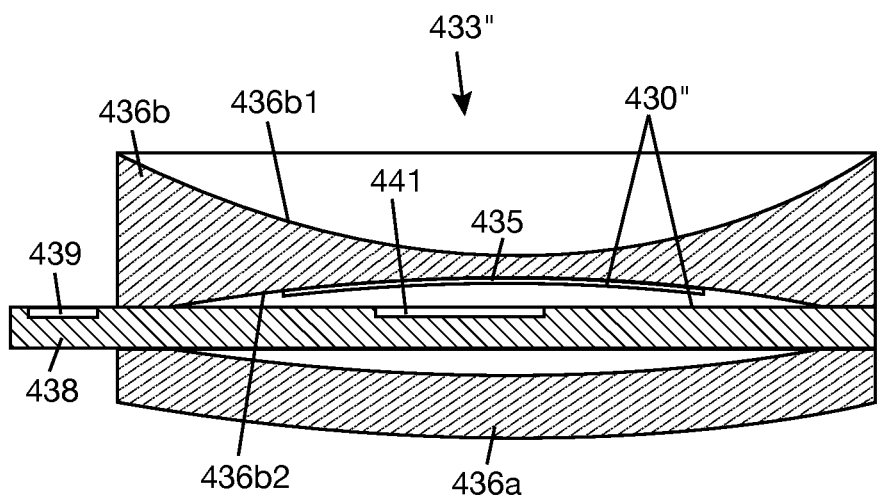

FIG. 4C-1 shows an alternative optical combiner lens 433" that may be used instead of optical combiner lens 433 in FIG. 4A. Optical combiner lens 433" includes an alternative transparent combiner 430" that is integrated with transparent lenses 436*a*, 436*b*. Lens 436*a* may be the world side lens, and lens 436*b* may be the eye side lens. Transparent combiner 430" includes a lightguide 438 disposed between lenses 436*a*, 436*b*. An input coupler 439 may be optically coupled to an input area of the lightguide 438, and an output coupler 441 may be optically coupled to an output area of the lightguide 438. Couplers 439, 441 may be optical gratings, prisms, and the like. Light received into lightguide 438, for example, through input coupler 439, propagates along the length of lightguide 438 by total internal reflection, and exits through output coupler 439 in a direction towards the eye. Transparent combiner 430" may include a hot mirror 435, as described above, to redirect infrared light in a direction towards the eye. Hot mirror 435 may be applied as a coating or film on an outer surface 436*b*1 of lens 436*b*, as shown in FIG. 4C-1, or may be applied as a coating or film on an inner surface 436*b*2 of lens 436*b* as shown in FIG. 4C-2. In other examples, an infrared hologram may be used instead of hot mirror 435 in FIGS. 4C-1 and 4C-2.

When optical combiner lens 433" shown in FIG. 4C-1 or 4C-2 is used in the system 400 of FIG. 4A, the visible light path may be separated from the infrared light path so that the hot mirror 435 (or infrared hologram if used instead of the hot mirror) receives the infrared light and the lightguide 438 receives the visible light. This may require two optical scanners, one for each of the infrared light path and the visible light path. Alternatively, one optical scanner may be used, and the infrared light may be split from the visible light downstream of the optical scanner so that the infrared light is directed to the hot mirror and the visible light is directed to the input area of the lightguide 438.

Returning to FIG. 4A, system 400 includes an infrared detector 440 (corresponding to infrared detector 340 in FIG. 3A) that is positioned, oriented, and operable to detect at least a portion of a reflection of infrared light from eye 402. As used herein, the term "infrared detector" refers to a device that is sensitive to and responsive to infrared light and that provides signals responsive to sensing or detecting infrared light. In one implementation, infrared detector 440 is a single photodiode sensor or photodetector that is responsive to infrared light. In another implementation, infrared detector 440 may be an array of photodetectors that are responsive to infrared light. In yet another implementation, infrared detector 440 may be a complementary metal-oxide semiconductor (CMOS) camera having an array of sensors that are responsive to light in the infrared range. Although FIG. 4A shows only one infrared detector 440, system 400 may have more than one infrared detector positioned, oriented, and operable to detect at least a portion of a reflection of infrared light from eye 402.

Infrared detector 440 may detect reflections of light directly and/or indirectly from eye 402 (see FIG. 3D illustrating an example of multiple paths through which reflection from an illuminated eye 302 may reach infrared detector 340). In one example, infrared detector 440 detects reflections of infrared light from transparent combiner 430 (430' in FIG. 4B, 430" in FIGS. 4C-1 and 4C-2). Reflections of infrared light from eye 402 may also reach infrared detector 440 directly from eye 402. Where infrared detector 440 is generally aligned to detect reflections of infrared light from transparent combiner 430 (430', 430"), the reflections that reach infrared detector 440 directly from eye 402 may be different in intensity and time of arrival compared to the reflections that reach infrared detector 440 from transparent combiner 430 such that it is possible to distinguish where each detected reflection is coming from.

System 400 includes a gaze tracker 450 (corresponding to gaze tracker 350 in FIG. 3A) that determines gaze position of eye 402 based on output of infrared detector 440 and scan orientation of optical scanner 420. Gaze tracker 450, laser module 410, optical scanner 420, and infrared detector 440 may be communicatively coupled to controller 460 (corresponding to controller 360 in FIG. 3A). Controller 460 and gaze tracker 450 may include processor-executable instructions, which may be stored in, for example, non-transitory storage medium or memory 470 (corresponding to storage medium/memory 370 in FIG. 3A). System 400 may include one or more processors, e.g., processor 480 (corresponding to processor 318 in FIG. 3A), for executing instructions on storage medium/memory 470. Since system 400 has a display capability, storage medium/memory 470 may further store data and/or processor-executable instructions that, when executed by processor 480, cause system 400 to project visible display content in the field of view of eye 402. In this case, processor 480 may execute instructions of gaze tracker 450 to determine a region in a field of view of eye 402 of the user at which a gaze of eye 402 is directed.

System 400 may include a proximity sensor 490 (corresponding to proximity sensor 390 in FIG. 3A). In the example shown in FIG. 4A, proximity sensor 490 is coupled to front frame 408 of WHUD. Proximity sensor 490 may measure a parameter value related to the position of the front frame 408 relative to a spot on the head of the user. The term "proximity sensor," as used in this disclosure, will be understood to mean any sensor that performs non-contact relative distance detection of an object. The measurements made by proximity sensor 490 may be used to determine when to recalibrate the glint space during eye tracking. System 400 may include a motion sensor 496 (corresponding to motion sensor 396 in FIG. 3A), such as an inertial motion unit (IMU), accelerometer, gyroscope, and the like. Motion sensor 496 may be used to detect movements of support frame 406. In the example shown in FIG. 4A, motion sensor 496 is coupled to an arm (or temple) 409a that is coupled to front frame 408. In other examples, motion sensor 496 may be mounted on the front frame 408 or some other part of the support frame 406 to give an indication of movements of support frame 406. In general, motion sensor 496 will not give a measurement of a value related to the position of the front frame 408 relative to the head of the user. Instead, motion sensor 496 may indicate that front frame 408 has moved, for example, and provide the magnitude and speed of the movement. Information from motion sensor 496 may be combined with information from proximity sensor 490 to determine when it might be beneficial to recalibrate the glint space.

FIG. 5 illustrates an example WHUD 500 incorporating elements of system 400. In the illustrated example of FIG. 5, WHUD 500 has a general shape and appearance of eyeglasses. However, it is possible for WHUD 500 to have other forms, such as a helmet with a visor, goggles, and the like. WHUD 500 has a support frame 506 (corresponding to support frame 406 in FIG. 4A) including a front frame 508 (corresponding to front frame 408 in FIG. 4A) and a pair of temples (or arms) 509a, 509b. Temples 509a, 509b are coupled to the opposite sides of front frame 508. Front frame 508 supports transparent lenses 536 (corresponding to transparent lens 436 in FIG. 4A), 538. Lens 536 may be an optical combiner lens with integrated transparent combiner 530 (corresponding to transparent combiner 430 in FIG. 4A or variants 430', 430" thereof in FIGS. 4B, 4C-1, and 4C-2). In one example, arm 509a carries a scanning laser projector 503 (corresponding to scanning laser projector 403 in FIG. 4A) and an infrared detector 540 (corresponding to infrared detector 440 in FIG. 4A). Temple 509b may carry a non-transitory processor-readable storage medium or memory 570 (corresponding to memory 470 in FIG. 4A) and one or more processors, e.g., processor 580 (corresponding to processor 480 in FIG. 4). A proximity sensor 590 (corresponding to proximity sensor 490 in FIG. 4A) may be coupled to the front frame 508, e.g., the proximity sensor 590 may be mounted on a bridge of front frame 508. A motion sensor 596 (corresponding to motion sensor 496 in FIG. 4A) may be coupled to temple 509a or other part of the support frame 506. At least a part of a gaze tracker 550 (corresponding to gaze tracker 450 in FIG. 4A) may be stored in memory 570. At least a part of a controller 560 (corresponding to controller 460 in FIG. 4A) may be stored in memory 570. Other system components not specifically shown may be coupled as needed to the support frame 506 or may be contained in other components coupled to the support frame 506. Front frame 508 may include communication structures to facilitate transfer of signals between the components mounted on arms 590a, 590b.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of tracking an eye of a user, comprising:
generating an infrared light over an eye tracking period;
scanning the infrared light over the eye;
detecting reflections of the infrared light from the eye;
identifying a plurality of glints from the detected reflections of the infrared light;
determining a glint center position of each glint relative to a glint space;
transforming each glint center position from the glint space to a gaze position in a display space in a field of view of the eye;
reconstructing at least one image of the eye from a portion of the detected reflections of the infrared light;
detecting a pupil in the at least one image; determining a pupil center position of the pupil;
determining a glint-pupil vector from the pupil center position and a glint center position of at least one glint corresponding in space to the pupil; and
recalibrating the glint space based on the glint-pupil vector.

2. The method of claim 1, further comprising selectively adjusting a display content in the display space based on the gaze position.

3. The method of claim 1, further comprising scanning visible light over the eye during at least a portion of scanning the infrared light over the eye.

4. The method of claim 1, wherein scanning the infrared light over the eye comprises scanning the infrared light over the eye by at least one scan mirror.

5. The method of claim 4, wherein identifying a plurality of glints from the detected reflections of the infrared light comprises detecting the reflections of the infrared light having an intensity that exceeds an intensity threshold.

6. The method of claim 5, wherein detecting the reflections of the infrared light having an intensity that exceeds an intensity threshold comprises detecting a centroid of rising and falling edges of an intensity profile of at least one reflection having an intensity exceeding the intensity threshold.

7. The method of claim 5, wherein determining a glint center position of each glint relative to a glint space comprises identifying a scan orientation of the at least one scan mirror corresponding in space to the glint and mapping the scan orientation to a position in the glint space.

8. The method of claim 1, wherein scanning the infrared light over the eye comprises scanning the infrared light over a transparent combiner positioned in the field of view of the eye and redirecting the infrared light towards the eye by the transparent combiner.

9. The method of claim 1, further comprising determining a first mapping function that transforms glint position coordinates from the glint space to gaze position coordinates in the display space and a second mapping function that transforms glint-pupil vectors from a glint-pupil vector space to gaze position coordinates in the display space.

10. The method of claim 9, wherein transforming each glint center position from the glint space to a gaze position in a display space comprises transforming the glint center position from the glint space to the gaze position in the display space using the first mapping function.

11. The method of claim 10, wherein recalibrating the glint space based on the glint-pupil vector comprises:
mapping the glint-pupil vector to a calibrating gaze position in the display space using the second mapping function; and
recalibrating the glint space based on the calibrating gaze position.

12. The method of claim 11, wherein recalibrating the glint space based on the calibrating gaze position comprises applying an offset to the first mapping function such that a gaze position obtained from the glint center position by the first mapping function and applied offset is consistent with a gaze position obtained from the glint-pupil vector by the second mapping function.

13. The method of claim 1, wherein reconstructing at least one image of the eye from the detected reflections of the infrared light occurs at a scheduled time during the eye tracking period.

14. The method of claim 1, wherein generating an infrared light over an eye tracking period, scanning the infrared light over the eye, and detecting reflections of the infrared light from the eye are performed on a wearable heads-up display (WHUD) worn on a head of the user, and wherein reconstructing at least one image from the detected reflections of the infrared light occurs in response to movement of the WHUD or in response to interaction of the user with the WHUD.

15. A head-mounted apparatus, comprising:
a support frame that in use is worn on a head of a user;
an optical combiner lens carried by the support frame, the optical combiner lens comprising a transparent combiner that is positioned within a field of view of an eye of the user when the support frame is worn on the head of the user;
a scanning laser projector carried by the support frame, the scanning laser projector comprising an infrared laser diode to generate infrared light and at least one scan mirror to reflect the infrared light;
an infrared detector carried by the support frame;
a processor carried by the support frame, the processor communicatively coupled to the scanning laser projector and the infrared detector;
a non-transitory processor-readable storage medium communicatively coupled to the processor, wherein the non-transitory processor-readable storage medium stores data and/or processor-executable instructions that, when executed by the processor, cause the apparatus to:
generate an infrared light by the infrared laser diode over an eye tracking period;
scan the infrared light over at least a portion of the optical combiner lens by the at least one scan mirror and redirect the infrared light from the optical combiner lens to the eye of the user by the transparent combiner;

detect reflections of the infrared light from the eye by the infrared detector;

identify a plurality of glints from the detected reflections of the infrared light;

determine, by the processor, a glint center position of each glint in a glint space;

transform, by the processor, each glint center position from the glint space to a gaze position in a display space in a field of view of the eye;

reconstruct, by the processor, at least one image of the eye from a portion of the detected reflections of the infrared light;

detect, by the processor, a pupil in the at least one image of the eye;

determine, by the processor, a pupil center position of the pupil;

determine, by the processor, a glint-pupil vector from the pupil center position and a glint center position of at least one glint corresponding in space to the pupil; and recalibrate, by the processor, the glint space based on the glint-pupil vector.

16. The head-mounted apparatus of claim 15, wherein the scanning laser projector further comprises at least one visible laser diode to generate visible light.

17. The head-mounted apparatus of claim 16, wherein the transparent combiner comprises a wavelength-multiplexed holographic optical element including at least one infrared hologram that is responsive to the infrared light and unresponsive to the visible light and at least one visible hologram that is responsive to the visible light and unresponsive to the infrared light.

18. The head-mounted apparatus of claim 16, wherein the transparent combiner comprises a hot mirror that is responsive to the infrared light and unresponsive to the visible light or an infrared hologram that is responsive to the infrared light and unresponsive to the visible light.

19. The head-mounted apparatus of claim 18, wherein the transparent combiner further comprises a lightguide having an input area to receive the visible light generated by the at least one visible laser diode and an output area to output the visible light.

20. The head-mounted apparatus of claim 16, wherein the non-transitory processor-readable storage medium further stores data and/or processor-executable instructions that, when executed by the processor, cause the apparatus to adjust a display content in a field of view of the eye by the scanning laser projector based on the gaze position of the eye.

* * * * *